United States Patent Office 3,123,461
Patented Mar. 3, 1964

3,123,461
HERBICIDAL COMPOSITIONS
Roy T. Gottesman, Glen Rock, N.J., assignor to Heyden Newport Chemical Corporation, New York, N.Y., a corporation of Delaware
No Drawing. Filed Jan. 17, 1961, Ser. No. 83,157
12 Claims. (Cl. 71—2.5)

This invention relates to novel herbicidal compositions and to methods of inhibiting plant growth. It further relates to new chemical compounds which exhibit herbicidal activity against representative monocotyledonous and dicotyledonous plants.

In accordance with this invention it has been discovered that the N-(halophenyl)-3,4-dimethyl-6-isobutenyl-tetrahydrophthalimides (1,2), which have the structure

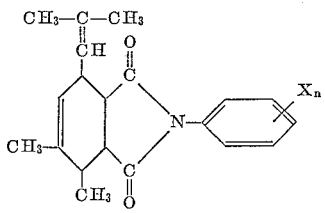

wherein X represents a halogen atom and $n$ represents a number in the range of 1 to 5 inclusive, having unusual and valuable activity as herbicides.

While each of these compounds may be used to control plant growth, the N-(p-halophenyl) compounds have been found to be of particular value as post-emergence herbicides. The usual and the preferred halogen substituents in these compounds are chlorine and bromine atoms. Other halogen substituents, that is, iodine and fluorine atoms, may also be used. The compounds may contain a single halogen substituent or two or more different halogen substituents. Specific examples of these compounds are N-(p-chlorophenyl)-3,4-dimethyl-6-isobutenyltetra-hydrophthalimide (1,2),
N-(p-bromophenyl)-3,4-dimethyl-6-isobutenyltetra-hydrophthalimide (1,2),
N-(p-iodophenyl)-3,4-dimethyl-6-isobutenyltetra-hydrophthalimide (1,2),
N-(p-fluorophenyl)-3,4-dimethyl-6-isobutenyltetra-hydrophthalimide (1,2),
N-(2,4-dichlorophenyl)-3,4-dimethyl-6-isobutenyl-tetrahydrophthalimide (1,2),
N-(3,4-dibromophenyl)-3,4-dimethyl-6-isobutenyl-tetrahydrophthalimide (1,2),
N-(2,4,6-trichlorophenyl)-3,4-dimethyl-6-isobutenyl-tetrahydrophthalimide (1,2),
N-(2,3,4,5-tetrachlorophenyl)-3,4-dimethyl-6-iso-butenyltetrahydrophthalimide (1,2), and
N-(2,3,4,5,6-pentachlorophenyl)-3,4-dimethyl-6-isobutenyltetrahydrophthalimide (1,2).

The novel compounds of the present invention may be prepared by the reaction of 3,4-dimethyl-6-isobutenyl-tetrahydrophthalic anhydride with the appropriate halogenated aniline. The reaction is preferably carried out in a solvent, such as benzene, toluene, or xylene, at the reflux temperature of the reaction mixture. If desired, higher or lower reaction temperatures may be employed. The product which is recovered from the reaction mixture may be purified by known techniques or it may be used without purification in herbicidal compositions.

The 3,4-dimethyl-6-isobutenyltetrahydrophthalic anhydride which is used as the starting material in the production of the novel compounds may be prepared by the reaction of approximately equimolecular quantities of allo-ocimene and maleic anhydride at a temperature between approximately 80° C. and 120° C.

The N-(halophenyl)-3,4-dimethyl-6-isobutenyltetrahydrophthalimides (1,2) may be applied to a wide variety of plants to control or inhibit their growth. They may be applied to an area containing a crop, for example, a bean or cotton crop, to inhibit the growth of weeds therein, or they may be used to keep an area free from all plant growth.

While the herbicidal compounds may be applied to the plants as such, they are preferably used in combination with a carrier. The products may be mixed with or deposited upon an inert finely-divided solid and employed as dusts. Such mixtures may also be dispersed in water with or without the aid of a wetting agent and the resulting aqueous suspensions employed as sprays. Alternatively, these products may be used as the active herbicidal constituents in ketone, ether, alcohol, or hydrocarbon solutions, in oil-in-water emulsions, or in aqueous dispersions. The concentration of the herbicidal compound may vary widely and depends upon a number of factors, the most important of which are the amount of the composition to be applied per unit of area and the type or types of plants being treated. Mixtures of two or more of these compounds may be used; if desired other herbicidal compounds may also be present in the herbicidal compositions.

Further details of the preparation and use of the novel compounds are set forth in the examples that follow. It is to be understood, however, that these examples are not to be construed as being limitative but are furnished merely for purposes of illustration.

*Example 1*

A mixture of 46.8 grams (0.2 mole) of 3,4-dimethyl-6-isobutenyltetrahydrophthalic anhydride and 25 ml. of toluene was placed in a flask equipped with an addition funnel, thermometer, agitator, Dean-Stark water trap, and condenser. To this mixture was added rapidly a solution of 25.5 grams (0.2 mole) of p-chloroaniline in 175 ml. of toluene. The mixture was heated at its reflux temperature (112°–116.5° C.) for 10.5 hours during which time approximately 2 ml. of water was collected in the water trap. After it had cooled to room temperature, the reaction mixture was washed with 300 ml. of a 20% sodium hydroxide solution. The alkaline aqueous extract which separated was discarded. To the organic residue was added 200 ml. of diethyl ether, and the resulting solution was washed with two 200 ml. portions of water. Then the solvents were removed by distillation to yield 50.7 grams of a dark brown viscous liquid which was identified as N-(p-chlorophenyl)-3,4-dimethyl-6-isobutenyltetrahydrophthalimide (1,2). This product contained 10.40% Cl and 4.00% N (calculated for $C_{20}H_{21}O_2NCl$: percent Cl, 10.35; percent N, 4.08).

*Example 2*

To a mixture of 93.6 grams (0.4 mole) of 3,4-dimethyl-6-isobutenyl-tetrahydrophthalic anhydride and 50 ml. of toluene was added rapidly a solution of 68.8 grams (0.4 mole) of p-bromoaniline in 200 ml. of toluene. The reaction mixture was heated at its reflux temperature (114°–119° C.) for 18 hours during which time 4.1 ml. of water was collected in the water trap. Following the addition of 200 ml. of diethyl ether, the reaction mixture was washed with two 150 ml. portions of a 20% sodium hydroxide solution and then with two 200 ml. portions of water. The solvents were removed by distillation under reduced pressure to yield 162.3 grams of a black glassy product which was identified as N-(p-bromophenyl)-3,4-dimethyl-6-isobutenyltetrahydrophthalimide (1,2).

Example 3

Groups of greenhouse flats containing soil were planted with bean, cotton, mustard, pigweed, foxtail and crabgrass seeds, respectively. Each flat contained seeds of one kind and was treated with a single herbicide. Eight days after planting the plants were sprayed with 0.3% aqueous suspensions of the herbicides. The quantity of solution used in each case was such as to apply the herbicide at a rate equivalent to 4 pounds per acre. In each case the results were observed 7 days after the application of the herbicidal solution.

In the table that follows, the effectiveness of the herbicides, as determined by comparison with untreated plantings, is indicated by the numbers "0" through "10" in increasing order of effectiveness. Thus "0" indicates no herbicidal activity; 1–3, slight injury; 4–6, moderate injury; 7–9, severe injury; and 10, destruction of all plants.

| Herbicide | Plant Species | | | | | |
|---|---|---|---|---|---|---|
| | Beans | Cotton | Mustard | Pigweed | Foxtail | Crabgrass |
| Product of Ex. 1 | 2 | 6 | 10 | 10 | 7 | 8 |
| Product of Ex. 2 | 1 | 4 | 10 | 10 | 5 | 6 |

From the data in the foregoing table, it is clear that the compounds of the present invention are effective as herbicides against a variety of common weed species. At the same time they have relatively little phytotoxic effect on beans and cotton.

I claim:
1. The compound of the formula

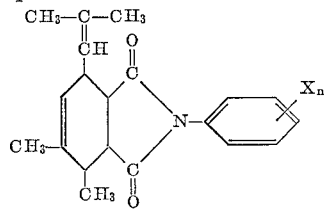

wherein X is a halogen atom and $n$ is a number in the range of 1 to 5 inclusive.

2. The compound of the formula

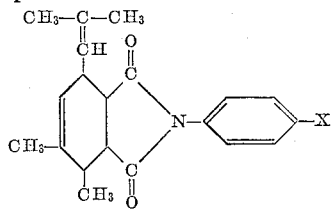

wherein X is a halogen atom.

3. The compound of the formula

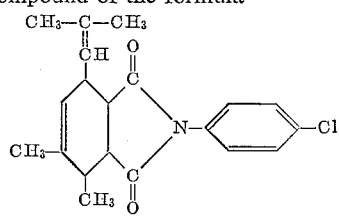

4. The compound of the formula

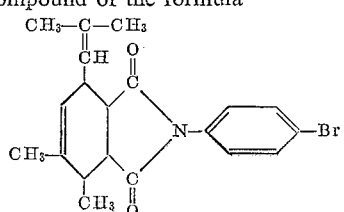

5. A herbicidal composition consisting essentially of a carrier and a phytotoxic amount of a compound of the formula

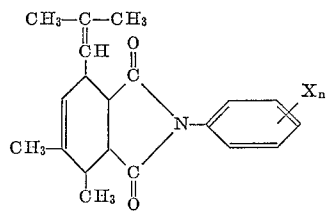

wherein X is a halogen atom and $n$ is a number in the range of 1 to 5 inclusive.

6. A herbicidal composition consisting essentially of a carrier and a phytotoxic amount of a compound of the formula

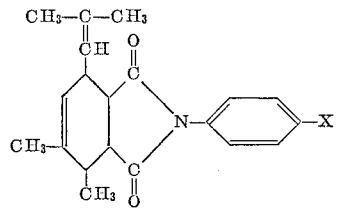

wherein X is a halogen atom.

7. A herbicidal composition consisting essentially of a carrier and a phytotoxic amount of a compound of the formula

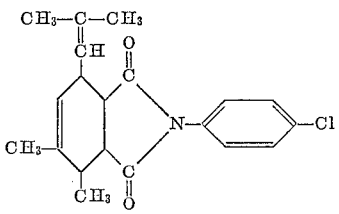

8. A herbicidal composition consisting essentially of a carrier and a phytotoxic amount of a compound of the formula

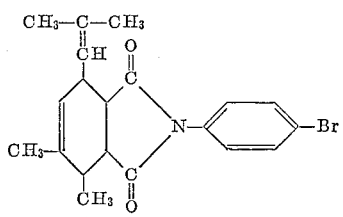

9. A process for the control of plant growth which comprises applying to the plants a phytotoxic amount of a compound having the structure

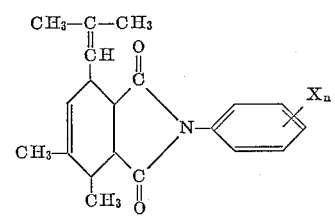

wherein X is a halogen atom and $n$ is a number in the range of 1 to 5 inclusive.

10. A process for the control of plant growth which comprises applying to the plants a phytotoxic amount of a compound having the structure

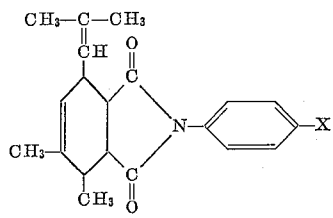

wherein X is a halogen atom.

11. A process for the control of plant growth which comprises applying to the plants a phytotoxic amount of a compound having the structure.

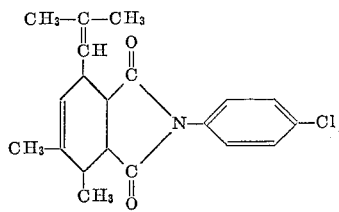

12. A process for the control of plant growth which comprises applying to the plants a phytotoxic amount of a compound having the structure

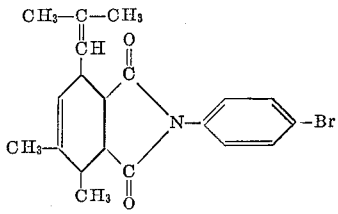

References Cited in the file of this patent
UNITED STATES PATENTS

| | | |
|---|---|---|
| 2,031,143 | Wolfram et al. | Feb. 18, 1936 |
| 2,087,715 | Wolfram et al. | July 20, 1937 |
| 2,693,408 | D'Amico | Nov. 2, 1954 |
| 2,701,252 | Vollmann et al. | Feb. 1, 1955 |
| 2,701,802 | Boyd | Feb. 8, 1955 |
| 2,813,877 | Lambech | Nov. 19, 1957 |
| 2,911,410 | Ramsay | Nov. 3, 1959 |
| 2,970,048 | Hamm et al. | Jan. 31, 1961 |